(12) United States Patent
Hacham David

(10) Patent No.: US 10,070,621 B1
(45) Date of Patent: Sep. 11, 2018

(54) PET ANXIETY VEST

(71) Applicant: Oren Hacham David, New York, NY (US)

(72) Inventor: Oren Hacham David, New York, NY (US)

(73) Assignee: Yaniv Adjedj, New York, NY (US)

( * ) Notice: Subject to any disclaimer, the term of this patent is extended or adjusted under 35 U.S.C. 154(b) by 0 days.

(21) Appl. No.: 15/901,192

(22) Filed: Feb. 21, 2018

(51) Int. Cl.
*A01K 13/00* (2006.01)
*A01K 15/02* (2006.01)
*A01K 27/00* (2006.01)

(52) U.S. Cl.
CPC ............ *A01K 13/006* (2013.01); *A01K 15/02* (2013.01); *A01K 27/009* (2013.01)

(58) Field of Classification Search
CPC .... A01K 13/006; A01K 15/02; A01K 13/008; A01K 15/00; A01K 27/008; A01K 29/00; A61D 9/00; A61D 99/00
USPC ................. 119/850, 792, 856, 859, 863, 712
See application file for complete search history.

(56) References Cited

U.S. PATENT DOCUMENTS

| | | | | |
|---|---|---|---|---|
| 5,509,859 A | * | 4/1996 | Klees | A63H 3/28 119/792 |
| 5,775,970 A | * | 7/1998 | Klees | A01K 27/006 119/792 |
| 6,694,925 B2 | * | 2/2004 | Critzer | A01K 13/006 119/850 |
| 7,121,231 B2 | * | 10/2006 | Benefiel | A01K 13/006 119/850 |
| 7,370,608 B1 | * | 5/2008 | Friedman | A01K 13/006 119/850 |
| 8,291,867 B2 | * | 10/2012 | Blizzard | A01K 13/006 119/850 |
| 8,733,296 B1 | * | 5/2014 | Douglas | A01K 13/006 119/850 |
| 8,807,090 B1 | * | 8/2014 | Potts | A01K 23/00 119/850 |
| 9,155,286 B2 | * | 10/2015 | Wickens | A01K 15/02 |
| 9,474,251 B2 | * | 10/2016 | Blizzard | A61D 9/00 |
| 2008/0110414 A1 | * | 5/2008 | Buehner | A01K 13/006 119/712 |
| 2010/0263603 A1 | | 10/2010 | Baron | |
| 2013/0186348 A1 | | 7/2013 | Blizzard | |
| 2017/0099807 A1 | | 4/2017 | Northrop et al. | |

* cited by examiner

*Primary Examiner* — Yvonne R Abbott-Lewis
(74) *Attorney, Agent, or Firm* — Dunlap Bennett & Ludwig PLLC

(57) ABSTRACT

A pet anxiety apparatus is provided. The pet anxiety apparatus embodies a compression vest providing scent, vibrational and audio therapeutic delivery components. The compression vest may be moved between a disengaged, unwrapped condition and an engaged, wrapped condition imparting the sensation of a hug to the pet animal wearing the pet anxiety apparatus. In the engaged, wrapped condition, a scent emitter is disposed directly downward of the pet's nose, while an audio output device is disposed along the animal's spinal near its ears, thereby providing tactile, scent, and audio therapy to a pet suffering from anxiety.

10 Claims, 2 Drawing Sheets

PET ANXIETY VEST

BACKGROUND OF THE INVENTION

The present invention relates to animal therapeutic apparatuses and, more particularly, to a pet anxiety apparatus embodying a compression vest delivering scent, vibrational and audio therapies through various components.

Domesticated animals, such as dogs, make such good pets because they share and appreciate many of the emotions and feelings that their owners do. Unfortunately, anxiety is one of the feelings pet animals share with their human owners. Like human anxiety, pet anxiety does not usually afford a simple one-prong solution. Currently pet anxiety devices, however, do not offer a multifaceted solution to alleviate pet anxiety.

As can be seen, there is a need for an animal therapeutic apparatus providing a multiple-pronged solution to address the problem of pet anxiety. The animal therapeutic apparatus of the present invention embodies the following: a compression vest that gives the animal the sensation of a hug; a scent emitter attached to the vest for emitting a calming scent; vibratory device providing soothing vibrations; and an audio output device attached to the vest for outputting a calming sound to relive the anxiety of the pet wearing the present invention.

SUMMARY OF THE INVENTION

In one aspect of the present invention, a pet anxiety apparatus includes a compression vest having a torso portion adapted to selectively wrap around a torso of a four-legged animal; at least one torso flap extending from the torso so that the torso portion is movable between an unwrapped and a wrapped condition around said torso; two neck straps extending from the torso portion so that the two neck straps are engageable around a neck of the four-legged animal; and an audio output device disposed along the torso portion so as to be disposed along a spinal cord of the four-legged animal in the wrapped condition.

In another aspect of the present invention, the pet anxiety apparatus includes a compression vest having a torso portion adapted to selectively wrap around a torso of a four-legged animal; at least one torso flap extending from the torso so that the torso portion is movable between an unwrapped and a wrapped condition around said torso; two neck straps extending from the torso portion so that the two neck straps are engageable around a neck of the four-legged animal; an audio output device disposed along the torso portion so as to be disposed along a spinal cord of the four-legged animal in the wrapped condition, wherein the audio output device is disposed along a collar of the four-legged animal; a scent emitter disposed along one of the two neck straps so as to be generally directly downward of a nose of the four-legged animal; and at least one vibratory device provided along the at least one torso flap so that in the wrapped condition, each vibratory device is located adjacent a guttural portion of the four-legged animal.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a pet anxiety apparatus embodying a compression vest providing scent, vibrational and audio therapeutic delivery components. The compression vest may be moved between a disengaged, unwrapped condition and an engaged, wrapped condition imparting the sensation of a hug to the pet animal wearing the pet anxiety apparatus. In the engaged, wrapped condition, a scent emitter is disposed directly downward of the pet's nose, while an audio output device is disposed along the animal's spinal near its ears, thereby providing tactile, scent, and audio therapy to a pet suffering from anxiety.

Figure 1:
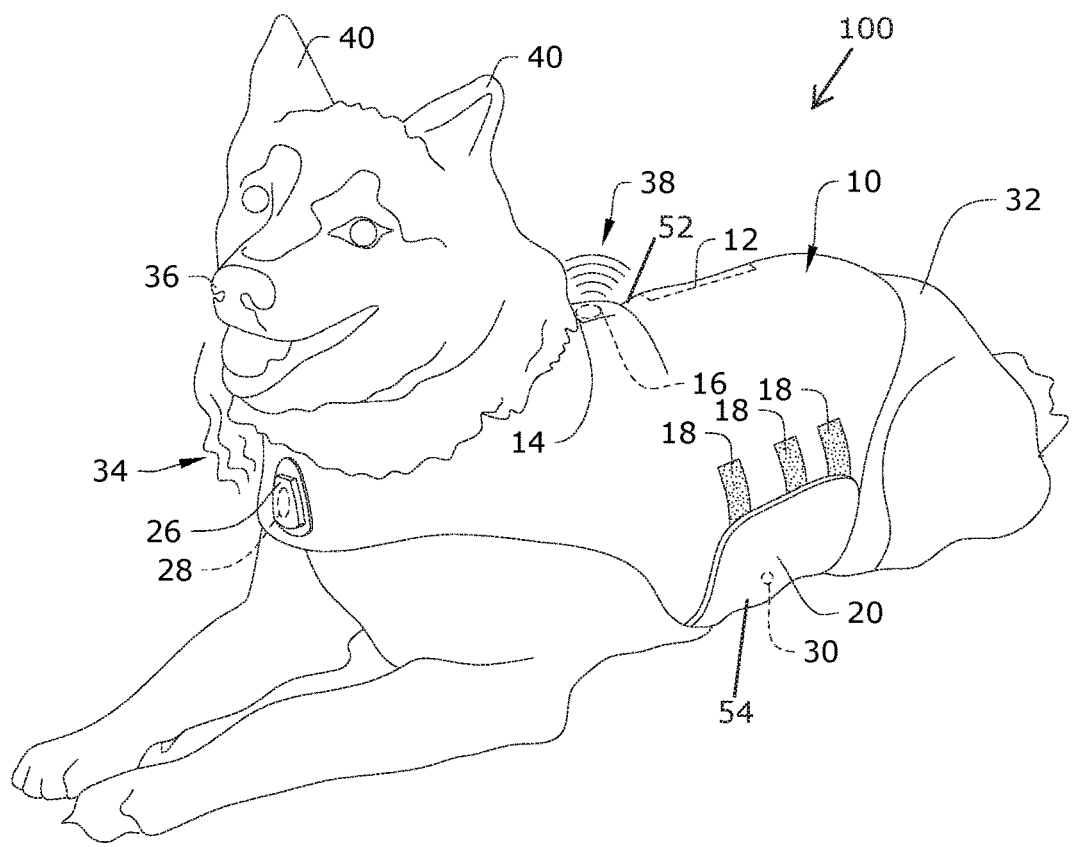
FIG. 1 is a perspective view of an exemplary embodiment of the present invention, shown in use.
Figure 3:
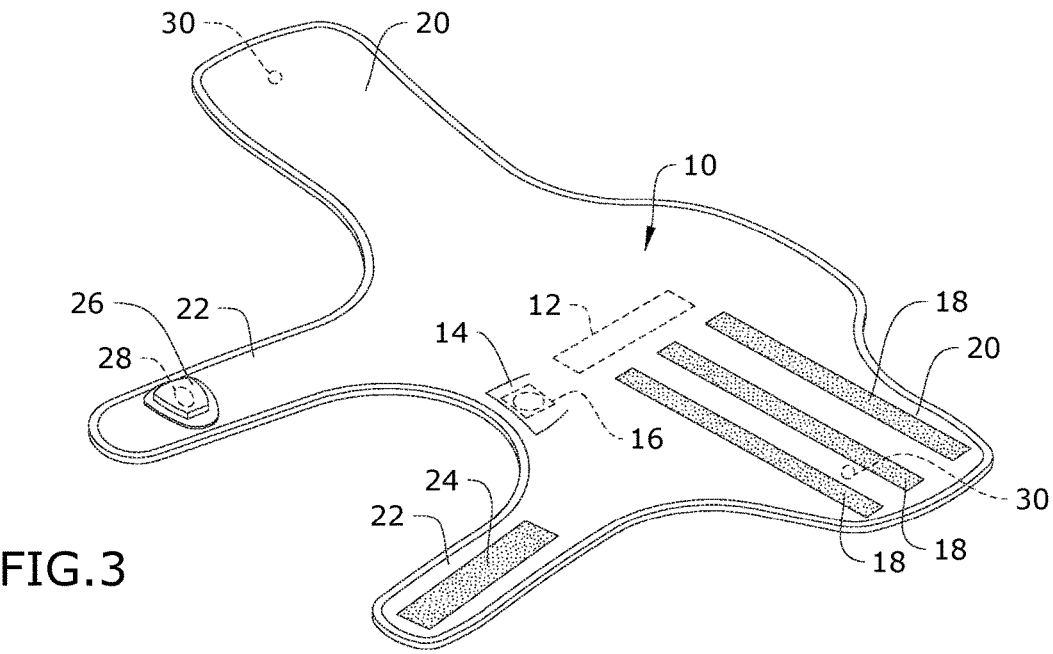
FIG. 3 is bottom perspective view of an exemplary embodiment of the present invention.
Figure 2:
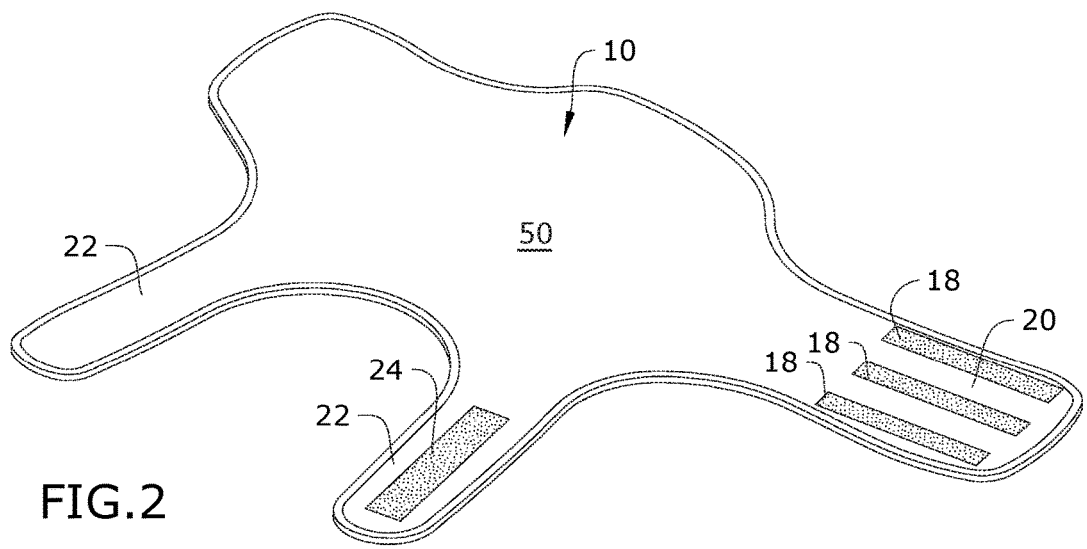
FIG. 2 is a top perspective view of an exemplary embodiment of the present invention.

Referring to FIGS. 1 through 3, the present invention may include a pet anxiety apparatus 100 embodying a compression vest 10 providing scent, vibratory and audio therapeutic delivery components 26, 30 and 16, respectively.

The compression vest 10 may be dimensioned and adapted to be worn by a four-legged animal 32. The compression vest 10 may include a torso portion 50 adapted to be wrapped around a spinal area and a guttural area of the animal 32, thereby the torso portion 50 provides a spinal portion 52 and a guttural area 54, accordingly. The torso portion 50 provides opposing torso flaps 20 providing flap fasteners 18 for positioning the torso portion 50 between a wrapped condition securely wrapped around a torso area of the animal 32, as illustrated in FIG. 1, and an unwrapped condition, as illustrated in FIGS. 2 and 3. One of the opposing flaps 20 may provide the vibration delivery mechanism 30 as that torso flap 20 forms a part of the guttural portion 54, whereby said torso flap 20 is located adjacent the guttural area of the animal 32 wearing the compression vest 10. An audio fastener 14, such as a pocket, may be provided along the spinal portion 52 so that in the wrapped condition, when worn by the animal 32, an audio output device 16 may be disposed near the ears 40 of the animal 32, i.e., a collar portion of the pet, as illustrated in FIG. 1. The torso portion 50 may also provide a message region 12 for providing a logo or message. The audio output device 16 may be a musical device adapted to play repeatable calming audio output 38, such as music every 30 seconds, inserted inside the fastener/pocket 14.

Referring the FIGS. 2 and 3, extending from the torso portion 50, in a direction generally orthogonal to the opposing directions in which the opposing torso flaps 20 extend away from each other, the compression vest 10 provides two generally parallel neck straps 22. Each neck strap 22 may provide strap fasteners 24 that can be removably mated to each other so as to move the neck straps 22 between an engaged condition wrapped about the neck of the animal 32 wearing the compression vest 10, as illustrated in FIG. 1, and a disengaged condition, as illustrated in the FIGS. 2 and 3. The scent emitter 26 may be disposed along one of the two neck straps 22 so as to be located generally directly downward of the nose 36 of the animal 32 wearing the compression vest 10 with the neck straps 22 are in the engaged condition, as illustrated in FIG. 1. The scent 34 may be emitted from the scent emitter 26 so as to waft up to said nose 36. The scent 34 may be the result of a lavender component 28, such as scent oil, operatively associated with the scent emitter 26, which may be a pocket housing the scent oil.

A method of using the present invention may include the following. The pet anxiety apparatus 100 disclosed above may be providing. After donning the compression vest 10 the remaining therapeutic components offer their different therapeutic support to ease the pet anxiety, the music 38 of the audio output device 16 working on the hearing sense, the therapeutic scent 34 on the smell sense, and the compression vest 10 and the vibratory device 30 working on the tactile sense.

It should be understood, of course, that the foregoing relates to exemplary embodiments of the invention and that modifications may be made without departing from the spirit and scope of the invention as set forth in the following claims.

What is claimed is:

1. A pet anxiety apparatus, comprising:
   a compression vest having a torso portion adapted to selectively wrap around a torso of a four-legged animal;
   at least one torso flap extending from the torso so that the torso portion is movable between an unwrapped and a wrapped condition around said torso;
   two neck straps extending from the torso portion so that the two neck straps are engageable around a neck of the four-legged animal;
   a scent emitter disposed along one of the two neck straps so as to be generally directly downward of a nose of the four-legged animal; and
   an audio output device disposed along the torso portion so as to be disposed along a spinal cord of the four-legged animal in the wrapped condition.

2. The pet anxiety apparatus of claim 1, wherein the audio output device is disposed along a collar of the four-legged animal.

3. The pet anxiety apparatus of claim 1, wherein the audio output device is configured to output music on a predetermined interval.

4. The pet anxiety apparatus of claim 1, further comprising a lavender scent emitting from the scent emitter.

5. The pet anxiety apparatus of claim 1, further comprising at least one vibratory device provided along the at least one torso flap so that in the wrapped condition, each vibratory device is located adjacent a guttural portion of the four-legged animal.

6. The pet anxiety apparatus of claim 1, further comprising a message region provided along the torso portion.

7. A pet anxiety apparatus, comprising:
   a compression vest having a torso portion adapted to selectively wrap around a torso of a four-legged animal;
   at least one torso flap extending from the torso so that the torso portion is movable between an unwrapped and a wrapped condition around said torso;
   two neck straps extending from the torso portion so that the two neck straps are engageable around a neck of the four-legged animal;
   an audio output device disposed along the torso portion so as to be disposed along a spinal cord of the four-legged animal in the wrapped condition, wherein the audio output device is disposed along a collar of the four-legged animal;
   a scent emitter disposed along one of the two neck straps so as to be generally directly downward of a nose of the four-legged animal; and
   at least one vibratory device provided along the at least one torso flap so that in the wrapped condition, each vibratory device is located adjacent a guttural portion of the four-legged animal.

8. The pet anxiety apparatus of claim 7, wherein the audio output device is configured to output music on a predetermined interval.

9. The pet anxiety apparatus of claim 7, further comprising a lavender scent emitting from the scent emitter.

10. The pet anxiety apparatus of claim 7, further comprising a message region provided along the torso portion.

* * * * *